United States Patent
Williams et al.

(10) Patent No.: US 6,248,893 B1
(45) Date of Patent: *Jun. 19, 2001

(54) NON-HETEROCYCLIC OXONOL INFRARED RADIATION SENSITIVE COMPOUNDS

(75) Inventors: Kevin W. Williams; Shiying Zheng, both of Rochester; Thap DoMinh, Webster, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/589,964

(22) Filed: Jun. 8, 2000

Related U.S. Application Data

(63) Continuation-in-part of application No. 09/444,690, filed on Nov. 22, 1999, now abandoned.

(51) Int. Cl.[7] .................. C07D 211/92; C07C 255/02
(52) U.S. Cl. ................ 546/347; 546/348; 558/390; 558/401; 558/403
(58) Field of Search .................. 558/390, 401, 558/403; 546/347, 348

(56) References Cited

U.S. PATENT DOCUMENTS 5,213,956   5/1993   Diehl et al. .................. 430/522

*Primary Examiner*—Richard L. Raymond
*Assistant Examiner*—Hung Liu
(74) *Attorney, Agent, or Firm*—J. Lanny Tucker

(57) ABSTRACT

Infrared radiation-sensitive compounds have been found that are represented by Structure DYE as follows:

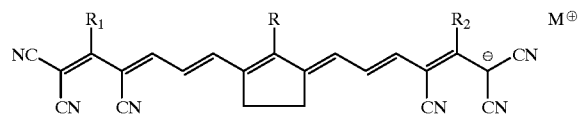

wherein R is a secondary or tertiary amine that contains no heterocyclic group, $R_1$ and $R_2$ are independently carbocyclic aromatic groups, and $M^+$ is a monovalent cation. These compounds have a $\lambda_{max}$ above 700 nm and are can be used in a number of photosensitive or heat-sensitive imaging materials.

7 Claims, No Drawings

NON-HETEROCYCLIC OXONOL INFRARED RADIATION SENSITIVE COMPOUNDS

RELATED APPLICATIONS

This application is a Continuation-in-part of U.S. Ser. No. 09/444,690 filed Nov. 22, 1999 now abn, by Williams, DoMinh and Zheng.

Another related application is commonly assigned U.S. Ser. No. 09/589,965 filed on even date herewith by Williams, DoMinh and Zheng, now abandoned and entitled "Heterocyclic Oxonol Infrared Radiation Sensitive Compounds."

FIELD OF THE INVENTION

This invention relates to novel compounds that are infrared radiation sensitive. More particularly, this invention relates to novel non-heterocyclic oxonol compounds that are sensitive at 700 nm or higher wavelengths in water or water-miscible organic solvents.

BACKGROUND OF THE INVENTION

Particulate compounds that absorb at various wavelengths have been used in photographic silver halide materials for many years. For example, such compounds have been used as "filter" dyes to absorb electromagnetic radiation ("light") from different regions of the electromagnetic spectrum, such as red, blue, green, ultraviolet and infrared regions. These filter dyes are often required to perform the function of absorbing light during exposure of the material so as to prevent or at least inhibit light of a particular region of the spectrum from reaching at least one of the radiation-sensitive layers of the material.

Particulate filter dyes can be designed with various features to facilitate their use and/or immobilization in photographic materials, as described for example in U.S. Pat. No. 5,213,956 (Diehl et al).

There is a need in the photographic industry for compounds that absorb in the near infrared and infrared regions of the electromagnetic spectrum for various purposes. Such materials can be used, for example, to absorb heat and to initiate or facilitate imaging in lithographic printing plates. However, such compounds (that is, IR dye sensitizers) must be compatible with other components of imaging formulations used in such printing plates.

Organic dye salts, by nature, are often partially soluble in water or alcoholic coating solvents and are thus preferred as IR dye sensitizers in lithographic plate imaging compositions. However, many such salts have been found to be unacceptable because of insufficient solubility, because they react with the charged polymer to form hydrophobic products that can result in scummed or toned images, or because they offer insufficient thermal sensitization in imaging members. In particular, there is a need to have IR dye sensitizers that are compatible with thiosulfate polymers, such as those described in copending and commonly assigned U.S. Ser. No., 09/156,833 filed Sep. 18, 1998, now U.S. Pat. No. 5,985,514.

SUMMARY OF THE INVENTION

We have discovered that certain non-heterocyclic oxonol compounds are useful as infrared radiation absorbing compounds in lithographic printing plates and other imaging elements describes herein. These novel compounds are soluble in water or water-miscible organic solvents, absorb radiation and have a $\lambda_{max}$ greater than 700 nm as measured in water or a water-miscible organic solvent. These compounds are also represented by Structure DYE shown as follows:

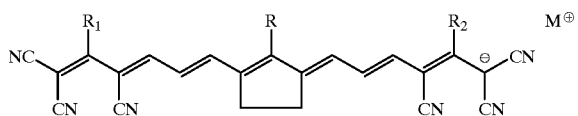

wherein R is a secondary or tertiary amine containing no heterocyclic group, $R_1$ and $R_2$ are independently carbocyclic aromatic groups, and $M^+$ is a monovalent cation.

These compounds have been found not only to have the desired infrared radiation absorption characteristics but also to be soluble in water or water-miscible organic solvents that are often used to formulate and coat lithographic printing plate imaging compositions. In addition, these compounds are compatible with negatively charged polymers that may be present in those compositions (for example, anionic polymers used for imaging such as those described in U.S. Ser. No. 09/156,833 noted above, now U.S. Pat. No. 5,985,514). In other words, no precipitates are formed when such compounds and polymers are mixed.

A preferred use of the compounds of this invention in printing plates is described in copending and commonly assigned U.S. Ser. No. 09/444,695 filed on Nov. 22, 1999 by DoMinh et al.

The compounds can also be used as filter dyes that are compatible with components in color and black-and-white photographic silver halide layers, and that do not adversely affect the sensitometric properties of such layers. We have also found that the compounds have desirable raw stock keeping.

DETAILED DESCRIPTION OF THE INVENTION

The compounds of this invention are oxonol infrared radiation sensitive dyes ("IR dyes") that comprise a methine linkage conjugated with 2 carbocyclic or aliphatic groups, one of which is negatively charged. They are soluble in water or any of the water-miscible organic solvents that are commonly useful for preparing heat-sensitive lithographic imaging compositions (for example, methanol, ethanol, isopropanol, 1-methoxy-2-propanol, methyl ethyl ketone, tetrahydrofuran, acetonitrile, butyrolactone and acetone). Preferably, the IR dyes are soluble in either water or methanol, or a mixture of water and methanol. Solubility in water or the water-miscible organic solvents means that the oxonol IR dye can be dissolved at a concentration of at least 0.5 g/l at room temperature.

The oxonol IR dyes are sensitive to radiation in the near-infrared and infrared regions of the electromagnetic spectrum. Thus, they generally have a $\lambda_{max}$ at or above 700 nm (preferably a $\lambda_{max}$ of from about 750 to about 900 nm, and more preferably a $\lambda_{max}$ of from about 800 to about 850 nm).

The oxonol IR dyes can be synthesized using general procedures described by Hamer in *The Cyanine Dyes and Related Compounds*, Interscience Publishers, 1964. A preferred synthetic method is described below.

The oxonol IR dyes of this invention can be represented by Structure DYE shown as follows:

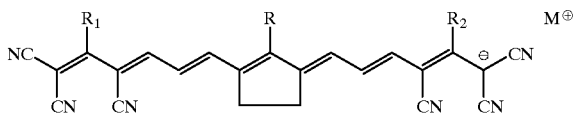

wherein R is a secondary or tertiary amine. The nitrogen atom of this amine group can be substituted, for example, with one or more substituted or unsubstituted alkyl groups having 1 to 20 carbon atoms (methyl, ethyl, isopropyl, t-butyl, hexyl, dodecyl, aminoethyl, methylsulfonaminoethyl and other groups readily apparent to one skilled in the art), substituted or unsubstituted aryl groups (such as phenyl, naphthyl, xylyl, m-carboxyphenyl and others than would be readily apparent to one skilled in the art), or a =C(N<)— group.

Preferably, R is a secondary amine having at least one phenyl substituent, or at least one substituted or unsubstituted alkyl group having 1 to 3 carbon atoms.

$R_1$ and $R_2$ are independently substituted or unsubstituted carbocyclic aromatic groups having from 5 to 12 atoms in the aromatic ring. Preferably, $R_1$ and $R_2$ represent the same aromatic carbocyclic group. Useful aromatic groups include, but are not limited to, substituted or unsubstituted phenyl groups or substituted or unsubstituted naphthyl groups. These aromatic groups can be substituted with one or more amino, methoxy, carboxy, sulfo, sulfonamido or alkylsulfonyl groups. Preferably, when $R_1$ and $R_2$ are substituted, they each have one or more of the same substituents.

The oxonol IR dyes of this invention contain no heterocyclic groups in R, $R_1$ or $R_2$.

$M^+$ is a suitable monovalent cation such as an alkali metal ion (lithium, sodium or potassium), an ammonium ion, a trialkylammonium ion (such as trimethylammonium, trimethylammonium or tributylammonium ions), a tetraalkylammonium ion (such as tetramethylammonium ion), pyridinium ion or tetramethyl guanidinium ion.

Examples of oxonol IR dyes of this invention include, but are not limited to, the following compounds:

DYE 1

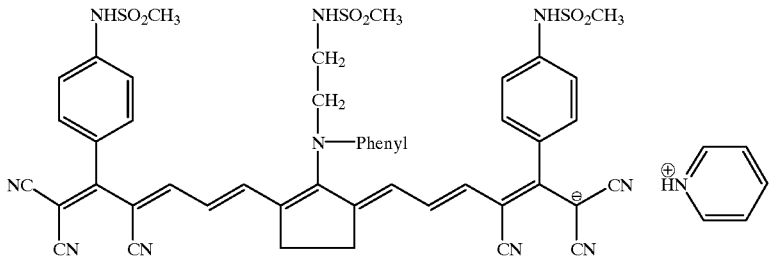

DYE 2

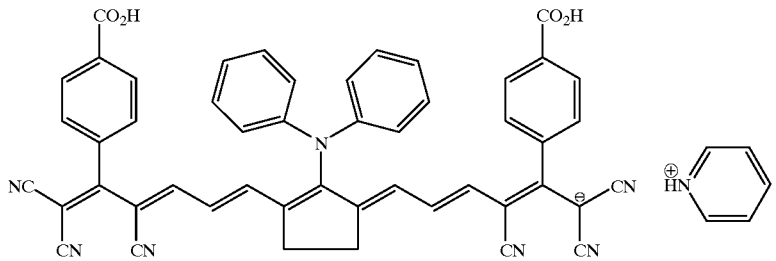

DYE 3

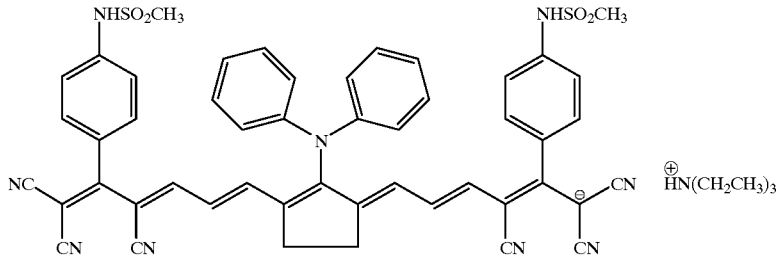

DYE 4

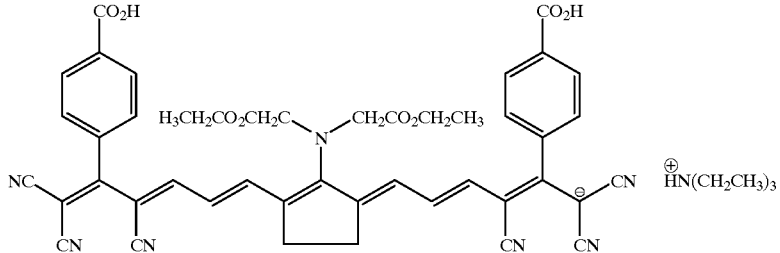

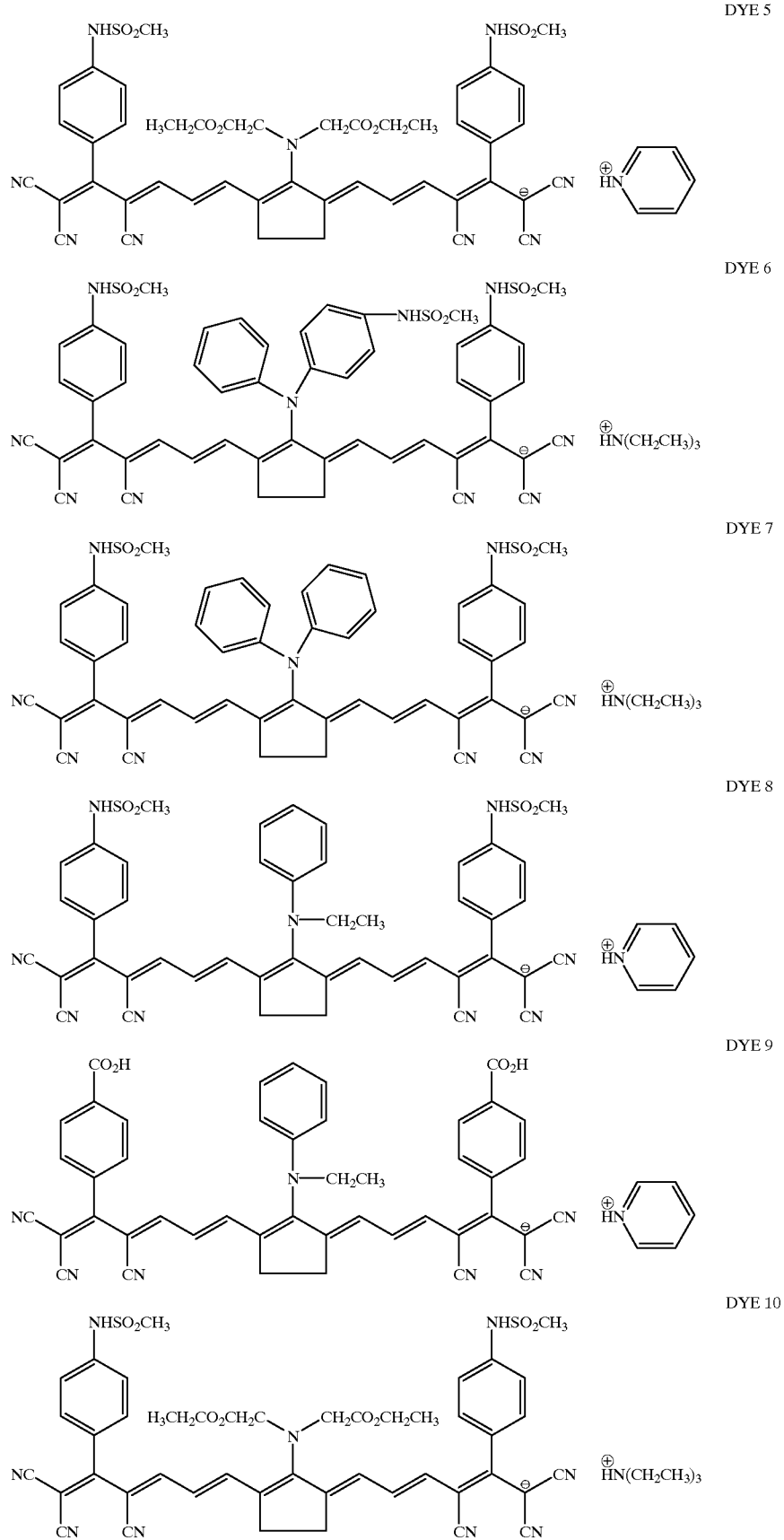

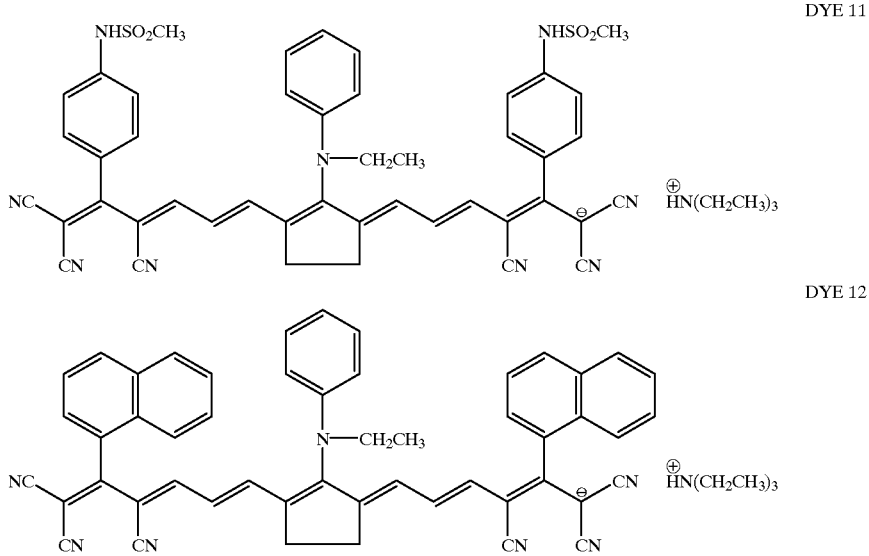

Further oxonol IR dyes are defined in reference to Structure DYE wherein $R_1$ and $R_2$ are each a phenyl group, as follows:

| IR Dye | R | $M^+$ |
|---|---|---|
| DYE 13 | —NH—C₆H₅ | $\overset{\oplus}{H}N(CH_2CH_3)_3$ |
| DYE 14 | —N(C₆H₅)₂ | $\overset{\oplus}{H}N(CH_2CH_3)_3$ |
| DYE 15 | —N=C(N(CH₃)₂)N(CH₃)₂ | $\overset{\oplus}{H}N(CH_2CH_3)_3$ |
| DYE 16 | —N=C(N(CH₃)₂)N(CH₃)₂ | $^{\oplus}NH_2=C(N(CH_3)_2)N(CH_3)_2$ |
| DYE 17 | —N(C₆H₅)(CH₂CH₃) | $\overset{\oplus}{H}N(CH_2CH_3)_3$ |

Oxonol IR Dye 2 was prepared using the following synthetic scheme that is generally useful for all of the compounds of this invention.

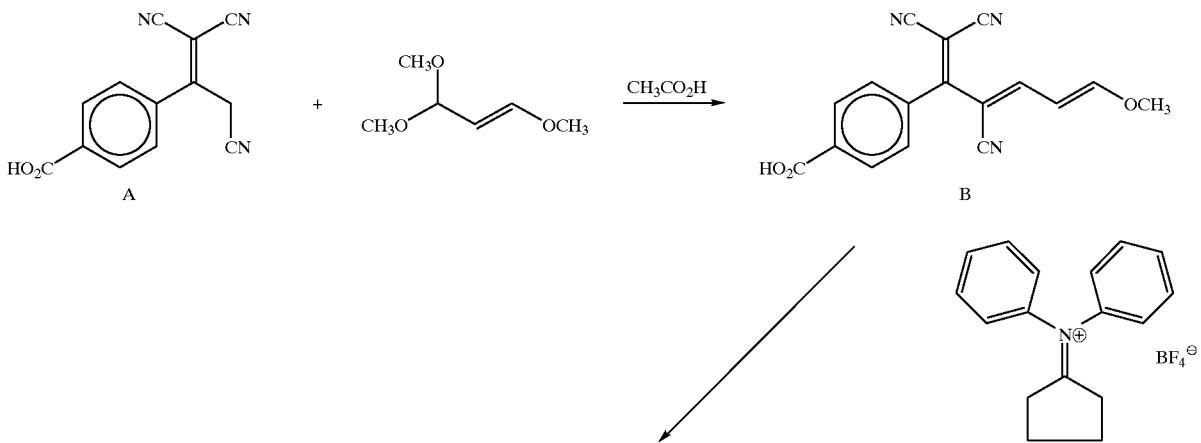

-continued

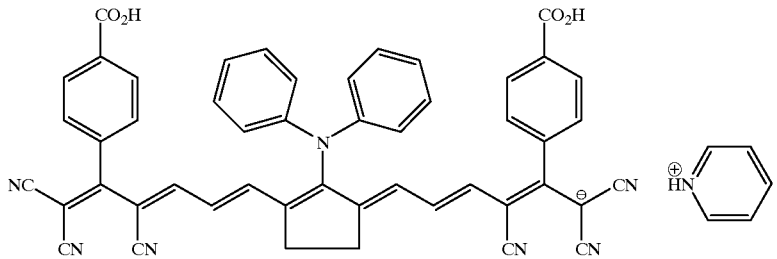

A sample of Intermediate A (23.6 g, 0.1 moles) and trimethoxypropene (33 g) were added into acetic acid (200 ml). The solution went homogeneous and then after 15 minutes at room temperature a yellow solid began to separate from the mixture. The resulting Intermediate B was collected by filtration after 1 hour (21 g, 70%). Intermediate B was used without further purification in the next step.

A sample of Intermediate B (30.5 g, 0.100 moles) and N-(1-cyclopentenyl-1-yl)-diphenylammonium tetrafluoroborate (16 g, 0.05 moles), prepared by the condensation of diphenylamine and cyclopentane in acetic acid with a stoichiometric amount of tetrafluoroboric acid, were added to pyridine (250 ml). The mixture was heated to boiling for 1 minute, allowed to cool to room temperature and then diluted with acetic acid (500 ml). The crude oxonol IR Dye 2 precipitated and was then collected by filtration. The dye was heated to boiling in acetic acid (200 ml) and water (100 ml) was added. The solution was allowed to cool to room temperature and the pure IR Dye 2 (94% by HPLC) was collected by filtration (27 g, 78%). The structure was confirmed by NMR and mass spectral data. The $\lambda_{max}$ was 1016 (pyridine) and $\epsilon_{max}$ was $11.8 \times 10^4$.

The following example illustrates a preferred utility for the compounds of this invention.

USE EXAMPLE 1

An imaging formulation was prepared using the components (parts by weight) shown in TABLE I below.

TABLE I

| Component | Formulation |
|---|---|
| Heat sensitive polymer | 0.30 |
| Oxonol IR Dye 1 | 0.03 |
| Water | 4.14 |
| Acetone | 4.50 |

The formulation was coated at a dry coating weight of about 1.0 g/m² onto a grained phosphoric acid-anodized aluminum support. The resulting printing plate was dried in a convection oven at 82° C. for 3 minutes. The imaging layer of the printing plate was imaged at 830 nm (0.35 optical density) on a plate setter using doses ranging from 360 to 820 mJ/cm². The blue imaging layer produced a deep blue image.

The imaged plate was mounted on the plate cylinder of a commercially available full-page printing press (A. B. Dick 9870 duplicator) for a press run. A commercial black ink and Varn Universal Pink fountain solution (from Varn Products Co.) were used. The plate developed on press within 60 seconds of the press run. The on-press processed plates rolled up after 10 sheets and printed with full density and high image quality for at least 1,000 impressions. The printing plate comprising oxonol IR dye 1 (at a 10:1 polymer:IR dye weight ratio and at 50% loading) had a photospeed of greater than 250 mJ/cm².

The heat-sensitive polymer poly(vinyl benzyl thiosulfate sodium salt-co-methyl methacrylate) shown in TABLE I was prepared as follows:

Vinyl benzyl chloride (10 g, 0.066 mol), methyl methacrylate (15.35 g, 0.153 mol) and AIBN (0.72 g, 4 mmol) were dissolved 120 ml of toluene. The solution was purged with dry nitrogen and then heated at 65° C. overnight. After cooling to room temperature, the solution was dropwise added to 1200 ml of isopropanol. The resulting white powdery polymer was collected by filtration and dried under vacuum at 60° C. overnight. $^1$H NMR analysis indicate that the copolymer contained 44 mol % of vinyl benzyl chloride.

This polymer (16 g) was dissolved in 110 m of N,N'-dimethylformamide. To this solution was added sodium thiosulfate (12 g) and water (20 ml). Some polymer precipitated out. The cloudy reaction mixture was heated at 90° C. for 24 hours. After cooling to room temperature, the hazy reaction mixture was dialyzed against water. A small amount of the resulting polymer solution was freeze dried for elemental analysis and the rest of the polymer solution was subject to imaging testing. Elemental analysis indicated that all the vinyl benzyl chloride was converted to sodium thiosulfate salt.

The invention has been described in detail with particular reference to preferred embodiments thereof, but it will be understood that variations and modifications can be effected within the spirit and scope of the invention.

We claim:

1. A compound that absorbs radiation and has a $\lambda_{max}$ greater than 700 nm as measured in water or a water-miscible organic solvent, and represented by the Structure DYE as follows:

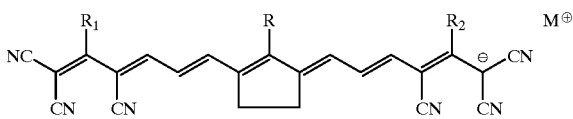

wherein R is a secondary or tertiary amine containing no heterocyclic group, $R_1$ and $R_2$ are independently substituted or unsubstituted phenyl or naphthyl groups, and $M^+$ is a monovalent cation.

2. The compound of claim 1 having a $\lambda_{max}$ of from about 750 to about 900 nm as measured in water or said water-miscible organic solvent.

3. The compound of claim 2 having a $\lambda_{max}$ of from about 800 to about 850 nm as measured in water or said water-miscible organic solvent.

4. The compound of claim 1 wherein R is an amine that has one or more substituted or unsubstituted alkyl groups or substituted or unsubstituted aryl groups, or R is an amine that is a —N=(C(N<)— group.
5. The compound of claim 4 wherein R is a secondary amine having at least one phenyl substituent, or an alkyl group having 1 to 3 carbon atoms.
6. The compound of claim 1 that is
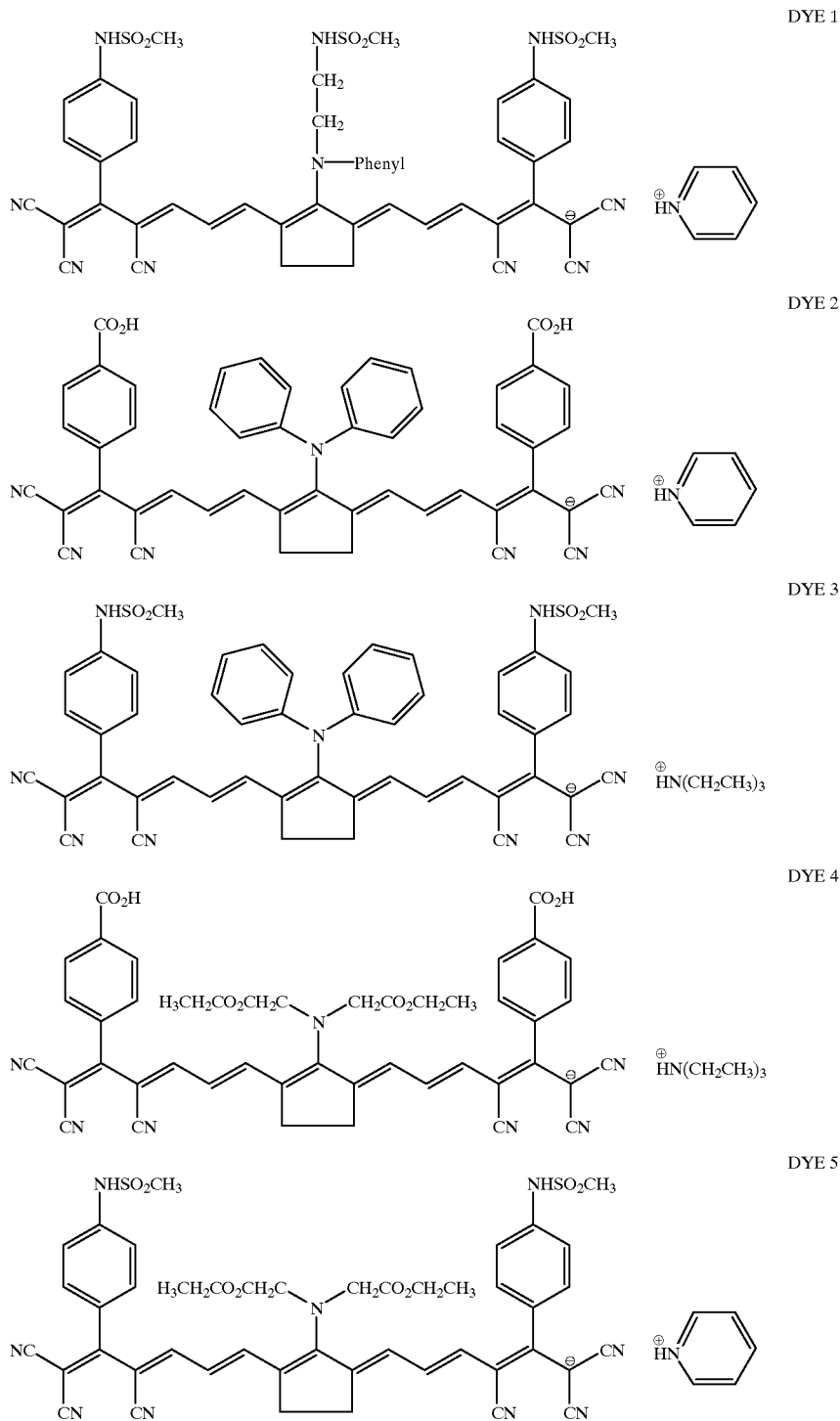

-continued
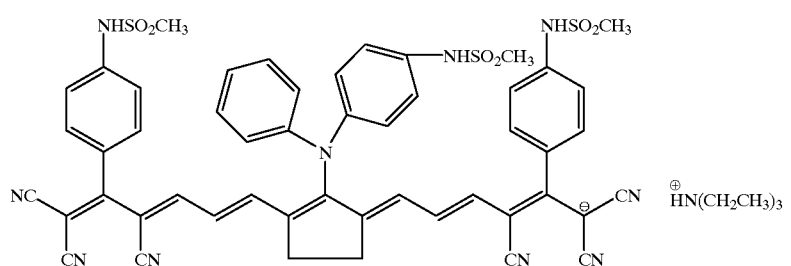
DYE 6
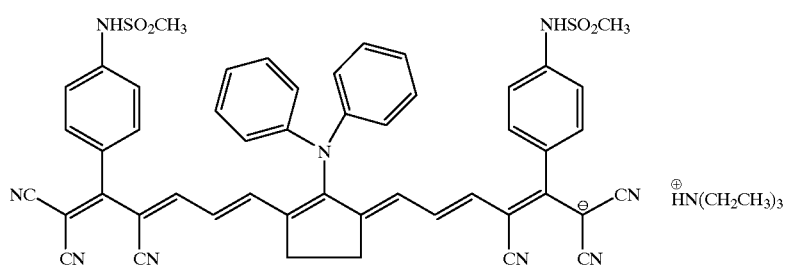
DYE 7
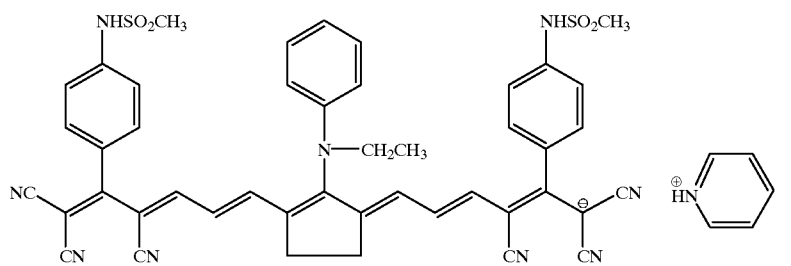
DYE 8
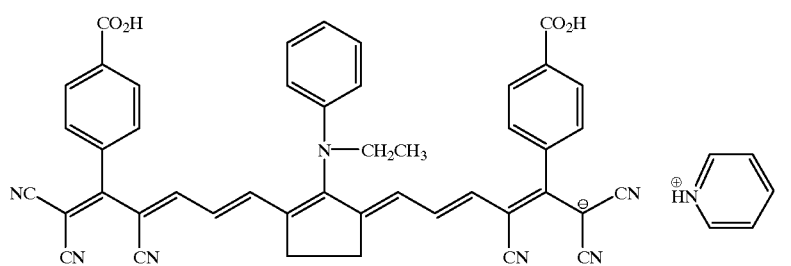
DYE 9
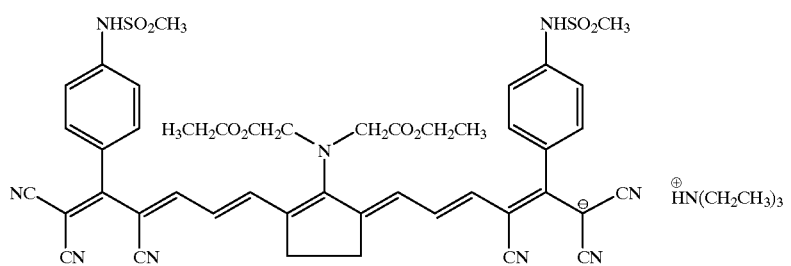
DYE 10
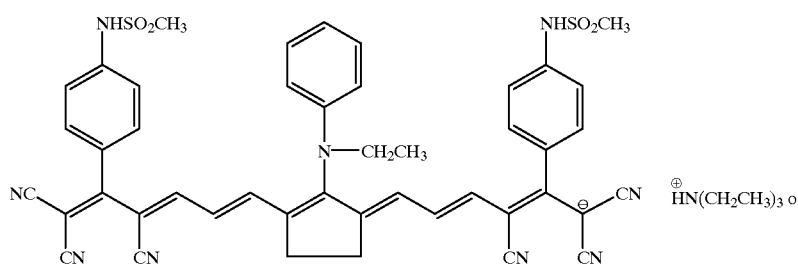
DYE 11

DYE 12
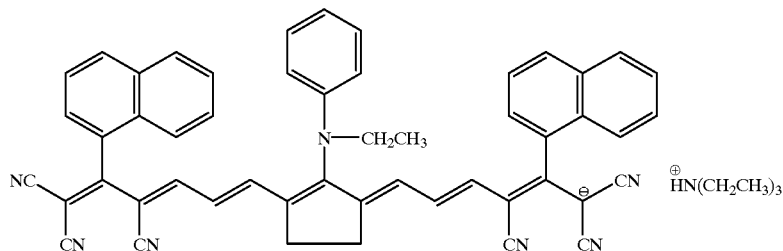
7. The compound of claim 1 wherein, in reference to Structure DYE, $R_1$ and $R_2$ are each a phenyl group and the IR Dye is:
| IR Dye | R | M+ |
|---|---|---|
| DYE 13 | —NH—C₆H₅ | $\overset{\oplus}{H}N(CH_2CH_3)_3$ |
| DYE 14 | —N(CH₃)(C₆H₅)₂ | $\overset{\oplus}{H}N(CH_2CH_3)_3$ |
| DYE 15 | —N=C(N(CH₃)₂)₂ | $\overset{\oplus}{H}N(CH_2CH_3)_3$ |
| DYE 16 | —N=C(N(CH₃)₂)₂ | $\overset{\oplus}{N}H_2=C(N(CH_3)_2)_2$ |
or
| IR Dye | R | M+ |
|---|---|---|
| DYE 17 | —N(CH₂CH₃)(C₆H₅) | $\overset{\oplus}{H}N(CH_2CH_3)_3$ |
* * * * *